US006640005B1

(12) United States Patent
Westerman et al.

(10) Patent No.: US 6,640,005 B1
(45) Date of Patent: Oct. 28, 2003

(54) METHOD FOR INCONSPICUOUSLY ADDING TRACKING DATA IN CODED IMAGES

(75) Inventors: Larry Alan Westerman, Portland, OR (US); Wenjun Zeng, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/423,000

(22) Filed: Oct. 21, 1999

(51) Int. Cl.$^7$ ................................................. G06K 9/00
(52) U.S. Cl. ....................... 382/166; 382/167; 382/232; 358/520; 345/590
(58) Field of Search ................................ 382/162, 166, 382/167, 172, 232, 233, 276, 245, 248, 224, 225, 100; 358/518, 520, 523; 345/590, 591, 604, 589, 600, 603

(56) References Cited

U.S. PATENT DOCUMENTS

| | | | | |
|---|---|---|---|---|
| 4,939,515 | A | 7/1990 | Adelson | 341/51 |
| 5,010,405 | A | 4/1991 | Schreiber et al. | 358/141 |
| 5,450,216 | A * | 9/1995 | Kasson | 345/603 |
| 5,613,004 | A | 3/1997 | Cooperman et al. | 380/28 |
| 5,689,587 | A | 11/1997 | Bender et al. | 382/232 |
| 5,727,092 | A | 3/1998 | Sandford, II et al. | 382/251 |
| 5,748,783 | A | 5/1998 | Rhoads | 382/232 |
| 5,875,249 | A | 2/1999 | Mintzer et al. | 380/54 |
| 5,901,178 | A | 5/1999 | Lee et al. | 375/240 |
| 5,940,134 | A * | 8/1999 | Wirtz | 348/473 |
| 6,332,031 | B1 * | 12/2001 | Rhoads et al. | 380/232 |

OTHER PUBLICATIONS

"Image–Adaptive Watermarking Using Visual Models," by Christine I. Podilchuck and Wenjun Zeng, IEEE ISBN # 0733–8716/98, IEEE Journal On Selected Areas In Communications, vol. 16, No. 4, May, 1998, pp. 525–539.

"Transparent Robust Image Watermarking," by Mitchell D. Swanson, Bin Zhu and Ahmed H. Tewfik, Proc. IEEE Int. Conf. on Image Proc. '96, AFOSR grant AF/F49620–94–1–0461, 4 pages.

"Secure Spread Spectrum Watermarking for Multimedia," by Ingemar J. Cox, Joe Kilian, Tom Leighton and Talal Shamoon, Copyright NEC Research Institute, Technical Report 95–10, pp. 1–33.

"Secure Spread Spectrum Watermarking for Images, Audio and Video," by Ingemar J. Cox, Joe Kilian, Tom Leighton and Talal Shamoon, IEEE ISBN #0–7803–3258–X/96, pp. 243–246.

"Table B.14—DCT coefficients Table zero," ITU–T Rec. H.262 (1995 E), pp. 135–142.

"Information technology—Generic coding of moving pictures and associated audio information: Video," International Stadard ISO/IEC 13818–2, First Edition, May 15, 1996; Reference No. ISO/IEC 13818–2:1996(E); pp. 61–72.

Recommendation 601–1: "Encoding Parameters of Digital Television for Studios," Section 11F: Digital Methods of Transmitting Television Information, Recommendations and Reports, [Reprinted from International Telecommunications Union (ITU) 1986, XVIth Plenary Assembly, Dubrovnick, 1986, vol. XI, Part 1, Broadcasting Service (Television), (Geneva, 1986), 319–328], pp. 217–223.

(List continued on next page.)

Primary Examiner—Bhavesh M. Mehta
Assistant Examiner—Ali Bayat
(74) Attorney, Agent, or Firm—Marger Johnson & McCollom, PC

(57) ABSTRACT

A method embeds tracking data into image graphics data that represents the image according to a first colorspace. The tracking data is embedded during encoding in black or white locations of the image, as variations of the chrominance coefficients. When the resulting data is converted into a second color space, the user tracking data does not alter the eventual visual image. Decoding methods are also provided for extracting the tracking data.

22 Claims, 5 Drawing Sheets

OTHER PUBLICATIONS

"A Statistical Watermark Detection Technique without Using Original Images for Resolving Rightful Ownerships of Digital Images," by Wenjun Zeng and Beda Liu, IP 1802: Final Manuscript, to appear in IEEE Tran. Image Proc., 1999, pp. 1–36.

"Resilient Video Transmission and Multimedia Database Applications," by Wenjun Zeng, A dissertation presented to the faculty of Princeton University in candidacy for the degree of doctor of philosophy, Jun. 1997, pp. 164–168.

"A Digital Watermark," by R.G.van Schyndel, A.Z. Tirkel, and C.F. Osborne, ICIP'94, 3 pages.

"Cryptology for Digital T.V. Broadcasting," by Benoit M. Macq, and Jean–Jacques Quisquater, Proceedings of the IEEE, vol. 83, No. 6, Jun. 1995, IEEE ISBN # 0018–9219/95, pp. 944–957.

* cited by examiner

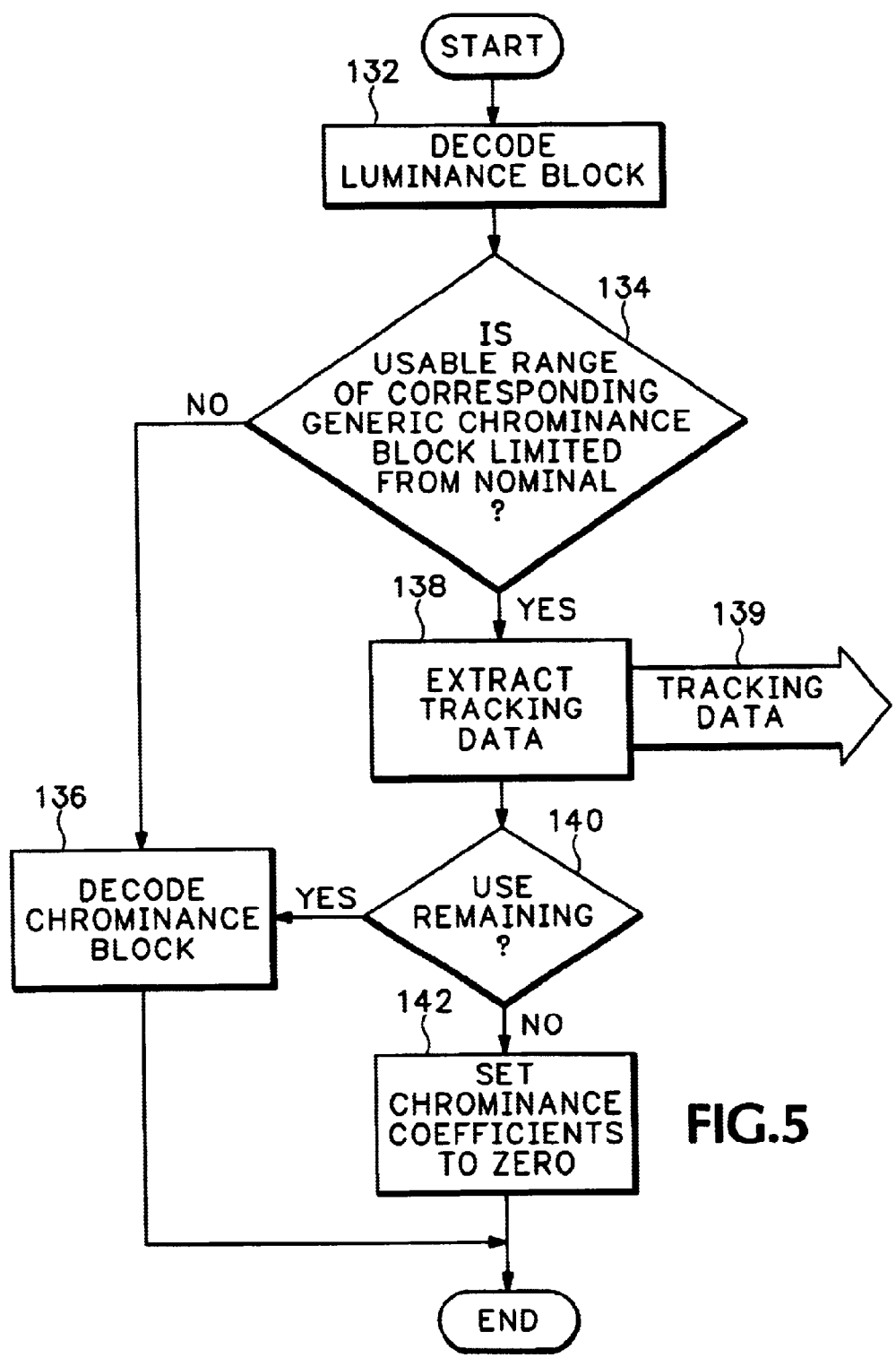

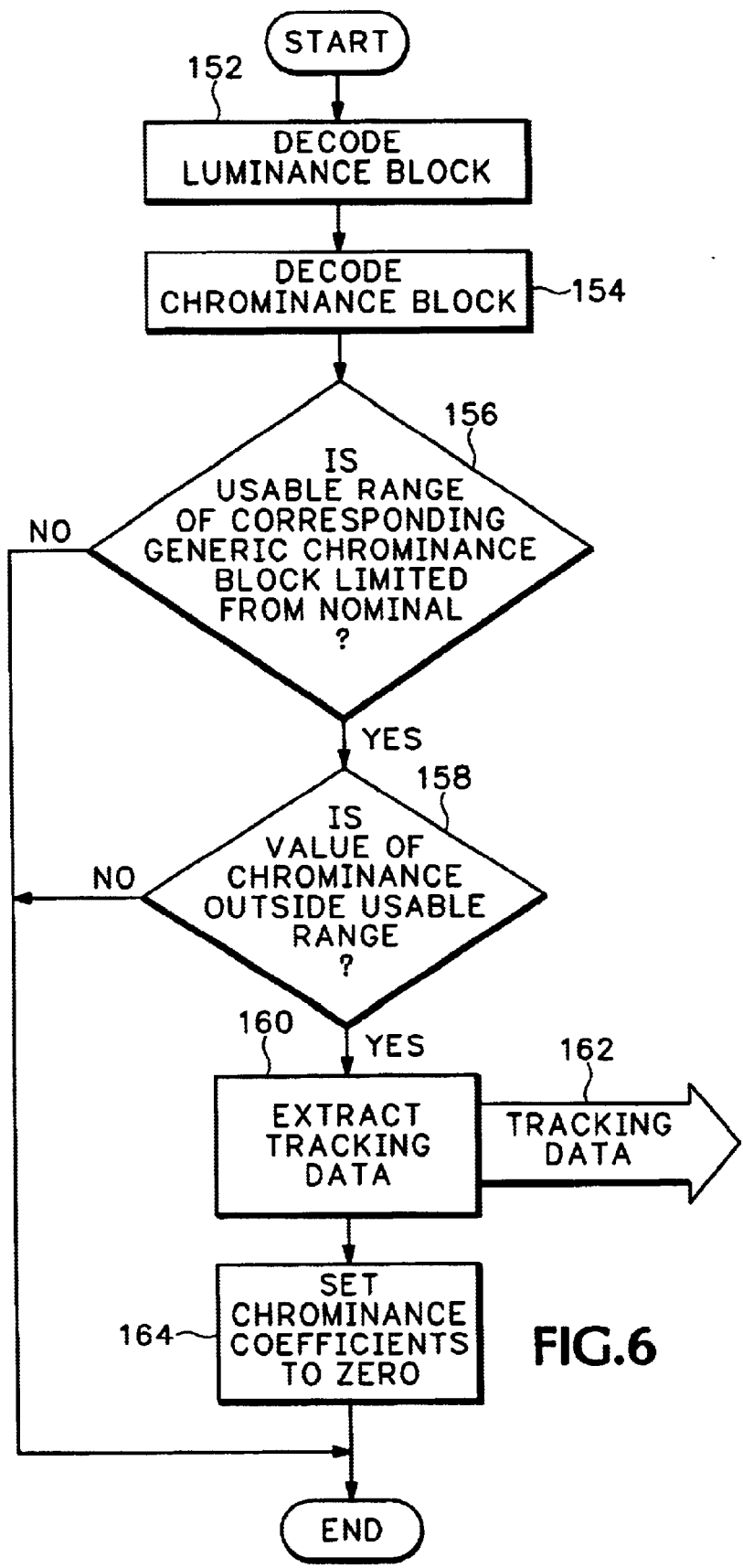

METHOD FOR INCONSPICUOUSLY ADDING TRACKING DATA IN CODED IMAGES

BACKGROUND OF THE INVENTION

1. Field of the Invention

The present invention is related to the field of steganography, and more specifically to techniques for embedding owner tracking data in still images and video in a manner that is difficult to detect.

2. Description of the Related Art

The digital representation of data has advanced the efficient and widespread distribution of information, which is generally desirable. However, the facile access to data also presents an increased opportunity for piracy of artistic works, without compensating the owner. Accordingly, methods are being invented for the owners to embed special data in the digital form of the artistic works. This special data, also known as owner tracking data or simply tracking data, corresponds to a signature of the owner. Once embedded in an artistic work, the tracking data can be used to track distribution of all copies of the artistic work.

The techniques for adding tracking data are also known as digital watermarking. A challenge that all such techniques face is that tracking data must be resistant to processing of the image. Such processes include channel noise, copying, filtering, resampling, cropping, lossy compression, resizing, digital to analog and analog to digital conversion. Some of these processes are usual in the ordinary course of treatment of video, whereas others may be intentional so as to remove the tracking data.

A problem in the prior art techniques is that the addition of owner tracking data alters the image. This not only annoys the viewer, but also alerts a prospective pirate as to the very existence of the tracking data.

BRIEF SUMMARY OF THE INVENTION

The present invention overcomes these problems and limitations of the prior art.

Generally, the present invention provides a method for embedding tracking data into graphics data that represents the image according to a first colorspace. The tracking data is embedded during encoding in host locations of the image that have a special host color. While these host locations map properly in the host color in a second colorspace without truncation, the tracking data maps into a blind space of the second colorspace. This does not alter the eventual visual image, which does not alerted the viewer to the presence of tracking data, while it makes it easy to extract the tracking data.

One encoding embodiment is to embed tracking data in the chrominance component of a signal, in locations of the image that are detected to have the host color of black and/or white. Detection of the image color is advantageously performed by examining the corresponding luminance component of the signal. The method is exceedingly resistant to ordinary image processing, because the black and white colors are generally not affected by the image processes.

The present invention results in simple rules for selecting host image areas, for encoding the data, and for extracting it either from the bitstream or from the decoded YCbCr image. The resulting bitstream is compliant with standard decoders. A large amount of user tracking data can be embedded in a given image, up to hundreds of bits of data in a single macro-block. The scheme of the invention also permits the efficient insertion of a small amount of tracking data.

The invention also includes corresponding methods for decoding graphics data so as to extract tracking data. The foregoing and other objects, features and advantages of the invention will become more readily apparent from the following detailed description of a preferred embodiment, which proceeds with reference to the drawings.

BRIEF DESCRIPTION OF THE DRAWINGS

FIG. 5 is a flowchart illustrating a decoding method according to an embodiment of the invention.

FIG. 6 is a flowchart illustrating a decoding method according to an embodiment of the invention.

DETAILED DESCRIPTION OF THE PREFERRED EMBODIMENT(S)

As has been mentioned, the present invention provides a method for embedding tracking data into graphics data during encoding. The method of the invention is used for encoding graphics data representing an image according to a first colorspace, when it is intended to subsequently map the graphics data into a second colorspace distinct from the first colorspace.

Mapping is the process of converting data to represent a color from one set of coordinates in the first colorspace to a second set of coordinates in the second colorspace, and is also known as gamut transform. The rules for gamut transforms are made such that they preserve a color, and are standardized and well known. The mapping rules often include truncation of values for which the correspondence alone has generated values outside the visual range.

Figure 1:
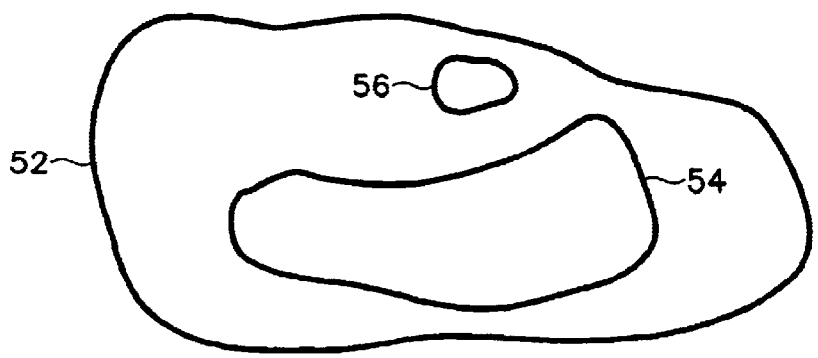
FIG. 1 is a two dimensional Venn diagram representation for illustrating a principle according to an embodiment of the invention.

Referring now to FIG. 1, a general concept about the method of the invention is described. Set 52 represents available graphics data values in the colorspace of the encoded signal containing the image. Set 54 represents available graphics data values in the colorspace of the decoded signal, after conversion. Set 54 is shown as a subset of set 52, although that is not necessary. What is necessary is that an area exists in set 52 that does not exist in set 54. However, set 54 could further have an area that does not belong in set 52.

Tracking data is embedded as graphics data, but having values in area 56 of set 52, that does not belong in set 54. As such, conversion of the image according to a gamut transform from set 52 to set 54 will not affect the eventual image. In such conversion, data with values in area 56 (which is the tracking data) will be truncated. Embedding is preferably performed during encoding of the image in graphics data values of the colorspace of set 52.

At the receiving end, while tracking data with values in area 56 will not produce a visible image, it can be extracted as desired for copy authentication and verification. Extraction is performed according to decoding methods of the invention.

Figure 2:
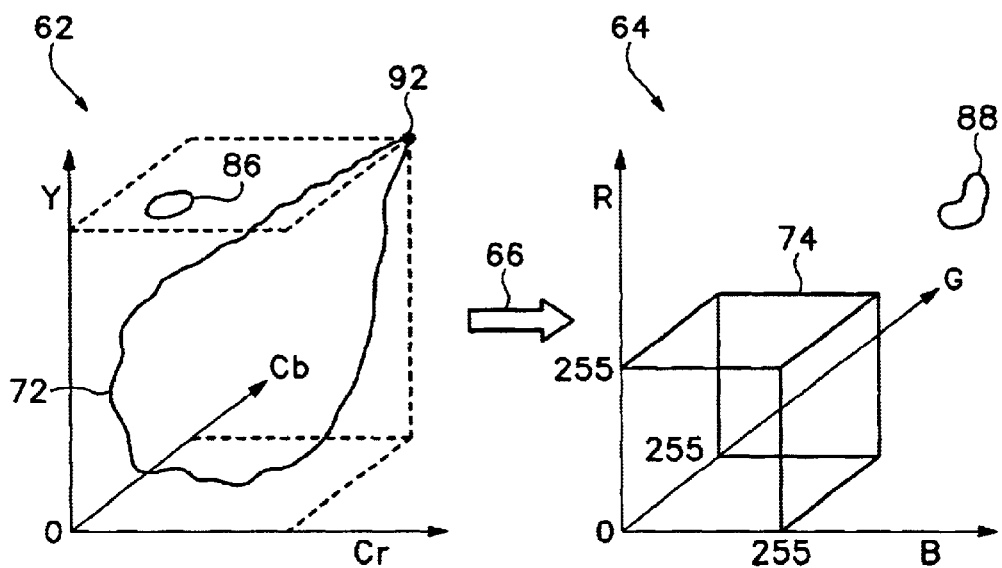
FIG. 2 is a drawing of a gamut transform from a first set of three dimensional axes to a second set of three dimensional axes to illustrate in more detail an example of the principle of FIG. 1.

Referring now to FIG. 2, a particular example is illustrated. The first colorspace 62 is the luminance-chrominance representation, also known as YCbCr representation. The second colorspace 64 is the Red-Green-Blue representation, a.k.a. the RGB representation. The intended gamut transform or mapping is depicted by arrow 66.

Each colorspace is depicted by three axes. Any point can be described in terms of coordinate values in the respective axes. However, only some of the points will produce a visible image. The rest will make no difference, unless processed further.

Specifically, the available graphics data values for the YCbCr colorspace 62 is approximately shown by a cloud 72, which is understood as being three dimensional. The available graphics data values for the RGB colorspace 64 are shown by a box 74, which is also understood as being three dimensional.

Modern compression algorithms for still images and video often manipulate image data coded in the luminance and chrominance difference colorspace, as use of this colorspace has distinct advantages for compression. The most significant advantage is the ability to separate luminance and chrominance data, and reduce the information content of the chrominance data significantly below that of the luminance, without sacrificing visual quality.

On the other hand, modern scanners, printers and video display systems typically use the RGB color space, which is a physically realizable mechanism for analyzing and displaying color patterns.

The conversion between RGB and YCbCr colorspaces has been defined as constructed in such a way that all RGB colors can be presented by corresponding YCbCr triplets. The opposite, however, is not true as explained in more detail below. In consequence, compression standards incorporate strict rules for the manipulation of YCbCr values, and include suggestions on how to transform these values to realizable colors.

The nature of gamut transform 66 is that R, G, B values are computed from the Y, Cb, Cr values as per the following correspondence, also known as a correspondence rule:

$$\begin{bmatrix} R \\ G \\ B \end{bmatrix} = \begin{bmatrix} 1.1643836 & 0.0 & 1.5960272 \\ 1.1643836 & -0.3917616 & -0.81296805 \\ 1.1643836 & 2.017231 & 0.0 \end{bmatrix} \left( \begin{bmatrix} Y \\ Cb \\ Cr \end{bmatrix} - \begin{bmatrix} 16 \\ 128 \\ 128 \end{bmatrix} \right)$$

This correspondence rule is specified by CCIR recommendation 601. Further, the values for R, G, B that produce visible image are limited as shown in box 74 as follows:

0<(R, G, B)<255.

Accordingly, gamut transform 66 further stipulates first a correspondence, and then preferably includes further processing in the form of a truncation, for values that do not produce visible image. The reason to include a truncation rule is to not generate errors in the syntax of the bitstream.

Importantly for practicing the present invention, a null region 86 is nominally available for encoding an image according to the YCbCr representation. In the special case, the null region 86 can be only a point, in which case it will be called a null point. Region 86 corresponds to a very high range of the available values of the luminance Y. At those values of the luminance, the usable range of values (within a cloud 72) for the allowed chrominance components is limited. By usable it is meant usable for representing distinct colors in the second colorspace 64. In the particular case of FIG. 2, null region 86 is outside that usable range 72 of values, and not usable for color representation, although there can be graphics data denominated in the YCbCr representation that describes data points in the null region 86. Null region 86 is mapped in blind region 88 of the RGB colorspace 64. The blind region 88 falls outside box 74, and thus it does not eventually produce an image, after the gamut transform 66. The blind region 88 can be a single blind point.

Consider the following example of the scheme of the invention. A value of Y=16 corresponds to a black pixel in an image, that is, (R,G,B) equals (0,0,0). The corresponding values of Cb and Cr are 128. The conversion of (Y,Cb,Cr)= (16,128,128) to RGB yields (0,0,0) as expected. In the present invention, the values of Cb and Cr can be other than 128. For example, the conversion of (Y,Cb,Cr)=(16,16,16) to RGB yields the values of (−0.7,0.5,−0.9). Conversion of these latter values to physically valid RGB values would yield (0,1,0), which would be visually indistinguishable from (0,0,0). Similarly, the conversion of (Y,Cb,Cr)=(16, 240,240) to RGB yields the values of (0,0,1), again visually indistinguishable from (0,0,0). Similar results are obtained for values of the luminance component Y near saturation (Y=235). Therefore, in image areas with Y near black or Y near white, values of the chrominance may be incorporated into the image which will contain data, which can be user tracking data of arbitrary form, but which will yield RGB values visually indistinguishable from black or white, respectively.

Importantly for the description of the present invention, attention is drawn to a point 92 in colorspace 62. The point 92 has the same luminance value as much of null region 86. Yet, point 92 itself corresponds to a color that can be mapped within box 74 of colorspace 64. As such, the color represented by the coordinates of point 92 is also known as a host color for purposes of the present invention. As will be understood, the host color can host tracking data.

Accordingly, one of the methods of the invention includes identifying one coordinate value of the first colorspace 62 that is common to two associated elements. The first element is a host color 92 of the first colorspace 62, that corresponds to a value in the second colorspace without truncation. The second element is at least one null region 86 within the first colorspace 62, that corresponds into a blind region outside the second colorspace prior to truncation. Alternately the method calls for identifying a host color that has an associated null region.

The method further includes identifying at least one location in the image that has an image color similar to the host color. Such a location is known as a host location of the image. Advantageously, identifying can be performed by examining the already encoded graphics data, such as a luminance value. The preferred host colors for colorspace 62 are black and white. As will be seen, these allow wide ranges of chrominance coefficients for encoding tracking data.

If more bandwidth is desired, other values can also be used. For example, ranges of the luminance value that correspond to a color at least as dark as (or darker than) a black threshold, or at least as light as (or lighter than) a white threshold. In the simplest case, the black threshold is the black color and white threshold is the white color.

Then the graphics data is modulated with the tracking data at the host location such that the host location will correspond to data with values in the blind region of the second colorspace. That is before any truncation is performed, as would be mandated by the mapping rules. Modulating can be such that the image color also includes data within the second colorspace.

Preferably, the choices are such that, after truncation, the visible color is identical to the host color.

Encoding methods of the invention are now described in more detail.

Figure 3:
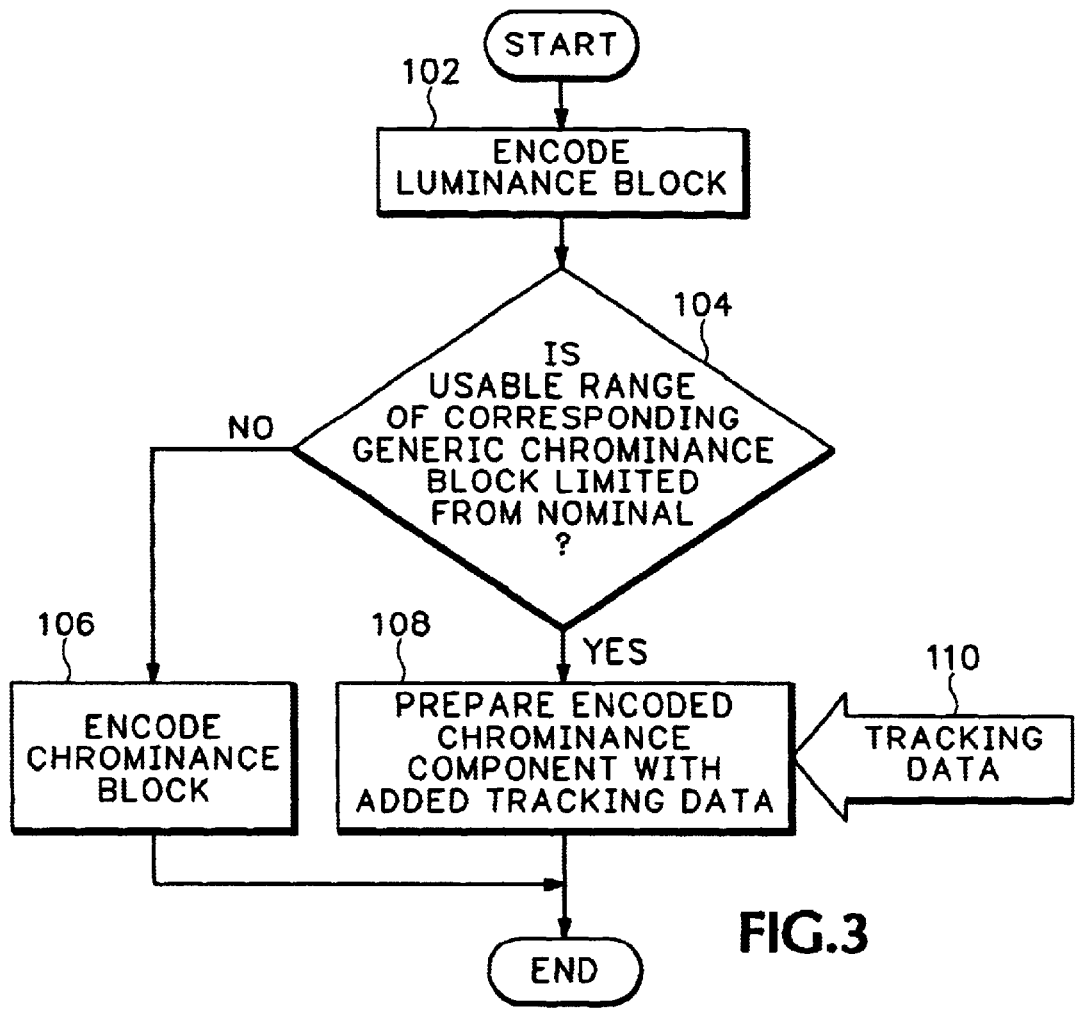
FIG. 3 is a flowchart illustrating an encoding method according to an embodiment of the invention.

Referring now to FIG. 3, according to box 102 a luminance block is encoded according to a first colorspace. Encoding is preferably performed by run length encoding a macro block of data corresponding to the image. It will be understood that, concurrently with encoding the data, the data is typically also compressed.

Then, according to box 104, it is determined whether a usable range for values of a generic chrominance component in the first colorspace is more limited than a preset nominally available range. In other words, would a generic chrominance component that corresponds to the encoded luminance component be limited from taking on any of the available values. In the case of chrominance, the chrominance component includes two coefficients Cb and Cr.

The determination is advantageously performed by examining the value of the luminance. As described above, luminance values that correspond to all black or all white would signify the host location, i.e. where the image is colored with suitable host colors. In its simplest form, the determination of box 104 is only in inquiry as to whether the color of a location is all black or all white.

If the determination of box 104 yields that the usable range for chrominance is not limited by the value of the luminance, then there will be no embedding or encoding of tracking data and this block. Then, according to box 106 a chrominance block is encoded that corresponds to the encoded luminance block.

If the determination of box 104 yields that the usable range is limited, then according to box 108 there is prepared an encoded chrominance component that corresponds to the luminance component. As will be appreciated, the encoded chrominance component need not be prepared with a view of the image. Preferably, for box 108, data specific run length codes are generated. The prepared chrominance component includes the tracking data 110. Preferably, the tracking data is included such that the resulting chrominance component has a value corresponding outside the usable range, prior to any truncation.

Afterwards, execution can return to box 102, for encoding more blocks.

Figure 4:
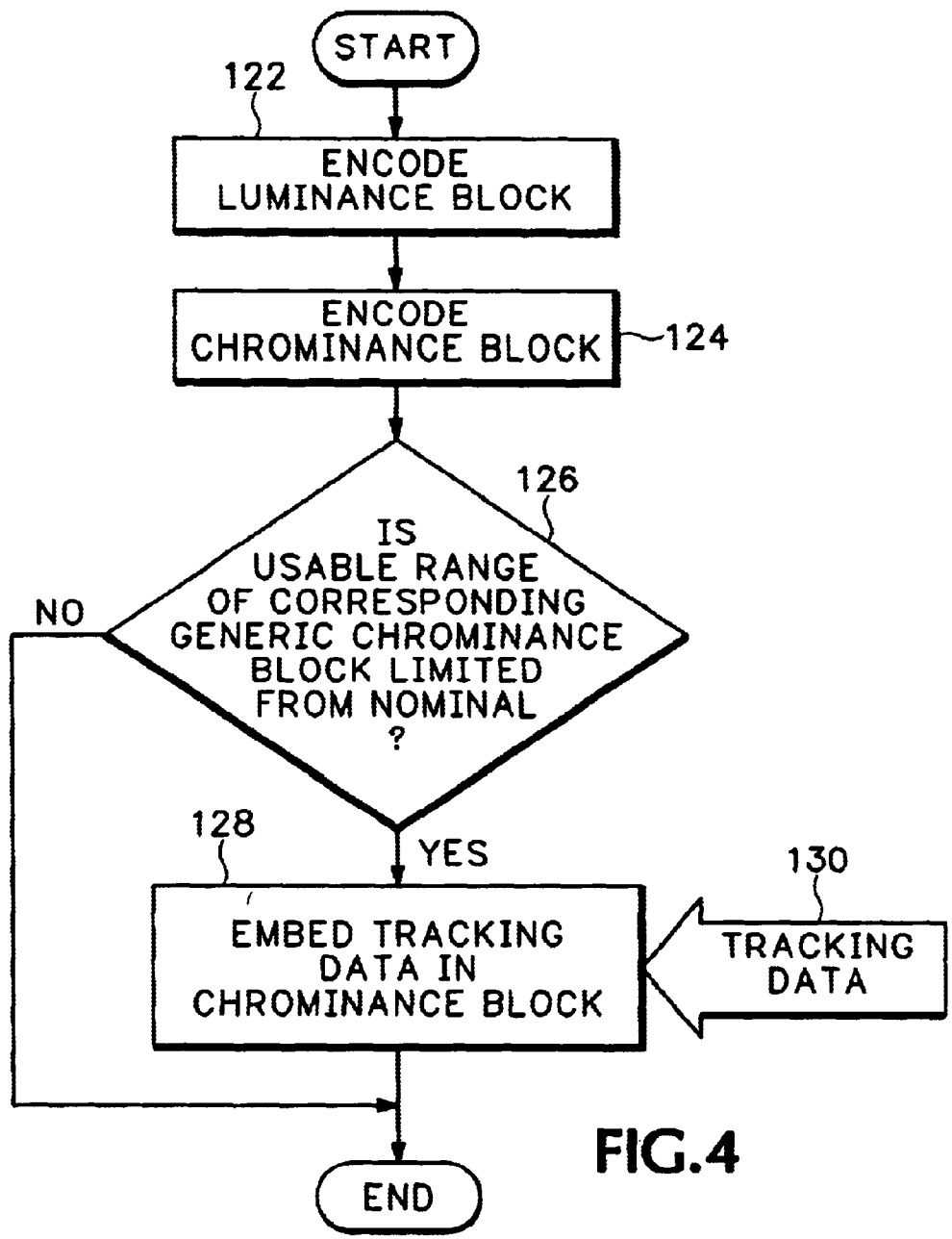
FIG. 4 is a flowchart illustrating an encoding method according to an embodiment of the invention.

Referring to FIG. 4, an alternate method is now described. According to box 122, a luminance block is encoded for the image. According to box 124, a chrominance block is encoded for the image. The operations of boxes 122 and 124 can be performed in either order, or concurrently.

Then according to box 126, similarly to box 104, it is determined whether a usable range for values of a generic chrominance component in the first colorspace is more limited than a preset nominally available range. If not, then there will be no encoding or embedding of tracking data in this block, and then execution optionally proceeds to encoding a subsequent block.

If the determination of box 126 yields that the usable range is limited, then according to box 128 tracking data 130 is embedded into the chrominance data. Again, it is preferred that embedding is such that the tracking data results in a chrominance component that does not affect the visual image, by its value derived from the correspondence alone, and prior to any truncation. A difference between the operation of box 128 and that of box 108 (of FIG. 3) is that in box 128 the host chrominance data was necessarily prepared in view of the image.

Methods are now described for encoding tracking data in the chrominance component. It will be appreciated that many methods are possible. These methods are for incorporating tracking data within the bitstreams of chrominance coefficients. In any event, in the method of the invention the encoded chrominance component typically includes a series of chrominance bits, the tracking data is typically tracking bits, and embedding is advantageously performed by inserting the tracking bits within the series of chrominance bits.

It will be appreciated that the various methods of embedding of the present, invention are sometimes such that do not affect the eventual visual image because of the inherent placement within the bitstream.

In a concrete example of how tracking data can be incorporated into a compressed bitstream, and how the tracking data is extracted from the stream according to the invention, the MPEG2 video compression standard (ISO/IEC 13818-2) is considered.

The syntax of the MPEG 2 video data stream defines strictly how video fields and frames are encoded. Each field or frame is divided into areas of 16×16 pixels. The YCbCr data within these areas are further divided into 8×8 blocks, which are transformed by a discrete cosine transform, quantized, and encoded according to a zig-zag scanning scheme. The color difference components may be encoded at lower spatial resolution than the luminance component. Typically, Cb and Cr are subsampled by a factor of two, both horizontally and vertically, resulting in single 8×8 Cb and Cr blocks within the macro-block structure. Fields and frames may be coded without reference to other fields are frames (I-field or frame), or by forward and/or backward prediction from other fields (P- and B-fields and frames respectively).

Within an I-frame, each macro block must be coded if it differs significantly from the previous macro block. When a macro block is coded, all components of the macro block (Y and Cb/Cr) must be encoded. For each block, the difference between the DC (average) value of the block is encoded as a difference from the predicted value (derived from the previously-encoded macroblock, or from a predefined standard value). Quantized non-DC DCT coefficients are encoded by means of a run-length encoding based upon a zig-zag scan of the coefficients, utilizing a fixed format Huffman type bit encoding scheme.

For a black macro block, the least data which could be transmitted is a difference of 0 from the predicted DC coefficient, followed by the end-of-block (EOB) pattern (binary bits 10), transmitted for each block in the macro block (bit pattern 10010 10010 10010 10010 0010 0010). The method of the invention can be used wherein the tracking data is placed in connection with an End-Of-Block pattern of the encoded chrominance component.

One embodiment of the present invention is to alter the content of the last two sets of four bits, to incorporate user tracking data. As examples, several alternative methods of inserting user tracking data are presented. These methods can be used with encoded macro blocks in I-frames (which by definition are intra-coded), or in intra coded macro blocks in P- or B-frames.

In the first method, a spatial sequence of coefficients is inserted into the Cb and Cr blocks of black or white macro blocks. The presence of these coefficients signals that the bitstream incorporates embedded user tracking data, since physically valid RGB values would not yield the corresponding pattern of YCbCr coefficients.

The form and content of the coefficients can encoded user tracking data itself. One example is for the bit pattern 11s (where s is the sign bit) to signal a run of 0 followed by a level of 1 or −1, depending on whether s is zero or one respectively. In terms of the corresponding DCT coefficients, this means that the next following DCT coefficient in the zig zag scan order is assigned a value of +/−1 (times the prevailing quantization parameter). Similarly the bit pattern 011s signifies a run of 1 followed by a level of 1 or −1, depending on the s bit. In terms of the corresponding DCT coefficients, this means that the second following DCT coefficient in the zigzag scan order is assigned a value of +/−1 (times the prevailing quantization parameter), with the intervening DCT coefficient set to zero.

This then forms the basis of embedding a code according to the embodiment of the invention. A sequence of data bits pairs can be incorporated in the form of 0/1 or 1/1 run/level codes, with the choice of the run/level code determined by the first binary bit in the pair, and the sign of the level determined by the second binary bit in the pair. For random input data, this requires 3.5 bits in the stream for 2 bits of data, or in average of 1.75 bits per user data bits. Up to 31 pairs of data bits can be unambiguously incorporated into a single 8×8 Cb or Cr block within this scheme.

While decoding is discussed more generally below, two methods are described in detail for decoding data encoded according to this scheme. First and most direct, the encoded bitstream itself can be parsed, and corresponding bit sequences directly decoded to reveal this user tracking data. If, however, the bitstream is not available, then the user tracking data can still be decoded from the resulting YCbCr data, which is produced by an inverse DCT operating on the decoded coefficients. If the DCT is applied to the Cb or Cr data, a pattern of coefficients will emerge (scaled by the quantization parameter), which can be interpreted according to the run/level code. It should be noted that this scheme is independent of the actual value of the quantization parameter, which is not known from the YCbCr data alone.

The method of the invention can also include placing the tracking data in connection with an Escape sequence of the encoded chrominance component. That would be by using the special Escape bit sequence defined in the standard. The six bit sequence 000001 signals that a special combination of run and level is encoded, which is not specified by another specific bit combination. The standard, however, does not limit the run and level specified after an Escape sequence, but merely defines the run as the next sequential six bits and level as the following 12 bit signed binary value. In this alternative, an Escape sequence signals the presence of user data in the bitstream, and the 18 bits of run/level data is the corresponding user data or tracking data. In this alternative, the decoding of the user data would require direct access to the bitstream data. The DCT data derived from the Cb or Cr data would yield the run value of the data, but the level would be ambiguous, because of the unknown quantization parameter. The advantage of this scheme is that 18 bits of user data can be incorporated into a block, with six bits of overhead, yielding 1⅓ bits per user data bit.

Another method of data embedding according to the invention is to set the 63 AC coefficients of the Cb or Cr block to either 0 or 1, according to the embedded binary data. This pattern is then encoded using the standard run/level Huffman encoding scheme. The efficiency of this method depends upon the random data to be encoded.

The method can be expanded to embed more data, if each 1 bit in the sequence yielded a unitary coefficient which was then modified, with the following bit setting the sign of the corresponding coefficient. By this scheme, the binary sequence 0100011 . . . could result in a sequence of coefficients 0, +1, 0, 0, −1, . . . Alternatively, each coefficient position could be considered a ternary code (0, +1, −1), and data encrypted using that basis. Ternary coding would permit the inclusion of 63 codes (63*$\log_2(3)$ bits) per Cb or Cr block. The person skilled in the art will immediately appreciate that more complex schemes can be derived by extension of these principles.

In the above described schemes, decoding does not require knowledge of the quantization factor. The method of the invention, however, can further use a value of a preset quantization factor for preparing the encoded chrominance component.

The data can be encoded is using coefficients over the full acceptable range (12 bits, or +/−2048). The embedding scheme may limit the acceptable value of coefficients to a smaller range, to take advantage of the Huffman coding used in transmitting the run/level information. For such a multi-level code, this user data could be extracted from the bitstream and decoded. If, however, the data decoder only has access to the decoding YCbCr data, then the quantization factor must be derived to decipher the data. In this case, the quantization factor could be incorporated into the scheme by requiring that the first coefficient be encoded as a +1 coefficient, which would permit the quantization factor to be derived from the decoded YCbCr data. The other coefficients could then be determined by normalization, using the derived quantization factor.

As would be appreciated from the above, in video segments the data can be placed in individual fields or frames of video to be extracted without data loss. Such control data can be used to associate specific characteristics with individual fields or frames, for example, labeling less significant frames within a sequence.

Moreover, potentially encrypted embedded data in individual frames of video can be used to verify the integrity of the received video. Further, it could signal segments of video which had been edited or otherwise manipulated.

Decoding methods according to the invention are now described. Naturally, removal of the embedded user tracking data from the encoded bitstream requires both an understanding of the syntax of the bitstream, and a knowledge of the protocol for the user tracking data incorporation.

Referring to FIG. 5, a received luminance block is decoded according to box 132. Preferably there are decoded a luminance block's run length bits patterns. At that time, a chrominance block that corresponds to the luminance block is also selected.

Then, according to box 134, similarly to box 104, it is determined whether a usable range for values of a generic chrominance component in the first colorspace is more limited than a preset nominally available range. If not, then it is determined that there was no encoded tracking data in this block, and then execution proceeds to decoding a chrominance block according to box 136, and then on to a next block.

As with the above, determination is advantageously performed by examining the value of the luminance block. The determination is based upon values used for encoding.

If it is determined at box 134 that the usable range is indeed limited, then it is automatically known that the chrominance data includes tracking data. As such, at box 138, the tracking data 139 is extracted.

Then, at box 140, it is inquired whether to use the remaining chrominance component. The choice will, of course, depend on the encoding protocol. If yes, execution continues to box 136. If no, then according to box and 142, the remaining chrominance component is set to a convenient value. The most convenient value for setting the chrominance coefficients is zero.

Referring now to FIG. 6, an alternate decoding method of the invention is described. According to boxes 152 and 154, a luminance and a chrominance component are decoded from a block. The operations of these boxes can be performed concurrently, or either one before the other.

Then, according to box 156, similarly to box 134, it is determined whether a usable range for values of a generic chrominance component in the first colorspace is more limited than a preset nominally available range. If not, then it is determined that there is no encoded tracking data in this block, and then execution proceeds to decoding a next block.

If it is determined that the usable range was indeed limited, then the value of chrominance is examined in box 158. If, prior to any truncation, it is not outside the usable range, then it is determined that there was no tracking data encoded or embedded, and execution for this block is complete If, prior to truncation, the value is outside the range, according to box 160 the tracking data 162 is extracted. Then again the chrominance component is set to a convenient value, such as setting chrominance coefficients to zero according to box 164.

A person skilled in the art will be able to practice the present invention in view of the present description, where numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. Applicant regards the subject matter of the invention to include all combinations and subcombinations of the various elements, features, functions and/or properties disclosed herein. For example, some of the boxes of FIG. 5 can interchanged with some of those of FIG. 6, and similarly for the encoding processes.

The following claims define certain combinations and subcombinations, which are regarded as novel and non-obvious. Additional claims for other combinations and sub-combinations of features, functions, elements and/or properties may be presented in this or a related application for patent.

The invention claimed is:

1. A method for adding to graphics data representing an image according to a first colorspace tracking data that does not represent the image, for subsequent mapping of the graphics data into a second colorspace distinct from the first colorspace according to a predefined gamut transform, the second colorspace including a limited usable range of values for color representation, the method comprising:
   identifying a host color within the first colorspace corresponding to a value that is in the usable range of the second colorspace according to the predefined gamut transform, the host color being associated with at least one null point within the first colorspace, the null point corresponding to a blind point that is outside the usable range of the second colorspace according to the predefined gamut transform;
   identifying at least one host location in the image having an image color similar to the host color; and
   modulating the graphics data with the tracking data such that the host image location will subsequently map data into the blind point of the second colorspace according to the predefined gamut transform.

2. The method of claim 1, wherein modulating is such that the host location will also map a portion of the data within the usable range of the second colorspace according to the predefined gamut transform.

3. The method of claim 1, wherein modulating is by adding tracking data as graphics data having a color of the null point according to the first colorspace.

4. A method for encoding graphics data representing an image while adding tracking data unrelated to representing the image comprising:
   encoding a substantially non-zero luminance component and a chrominance component for the graphics data according to a first colorspace; and
   determining whether a usable range for color representation in a second colorspace distinct from the first colorspace for values of a generic chrominance component corresponding to the encoded luminance component is more limited than a preset nominally available range for encoding in the first colorspace, and if so embedding the tracking data into the encoded chrominance component such that a resulting chrominance component corresponds to a value outside the usable range of the second colorspace prior to any truncation.

5. The method of claim 4,
   wherein determining includes examining a value of the luminance component for determining whether a color is one of at least as dark as a lower luminance threshold and at least as light as an upper luminance threshold.

6. The method of claim 5,
   wherein the lower luminance threshold corresponds to the color black in the second colorspace and the upper luminance threshold corresponds to the color white in the second colorspace.

7. The method of claim 4,
   wherein the encoded chrominance component includes a series of chrominance bits,
   wherein the tracking data is tracking bits, and
   wherein embedding is performed by inserting the tracking bits within the series of chrominance bits.

8. The method of claim 4, further using a value of a preset quantization factor for embedding the tracking data into the encoded chrominance component.

9. A method for encoding graphics data representing an image while adding tracking data unrelated to representing the image comprising:
   encoding a luminance component and a chrominance component for the graphics data according to a first colorspace;
   determining whether a usable range for color representation in a second colorspace distinct from the first colorspace for values of a generic chrominance component corresponding to the encoded luminance component is more limited than a preset nominally available range for encoding in the first colorspace, and if so, embedding the tracking data into the encoded chrominance component such that a resulting chrominance component corresponds to a value outside the usable range of the second colorspace prior to any truncation, and
   wherein the tracking data is embedded in connection with an End-Of-Block pattern of the encoded chrominance component.

10. A method for encoding graphics data representing an image while adding tracking data unrelated to representing the image comprising:
    encoding a luminance component and a chrominance component for the graphics data according to a first colorspace;

determining whether a usable range for color representation in a second colorspace distinct from the first colorspace for values of a generic chrominance component corresponding to the encoded luminance component is more limited than a preset nominally available range for encoding in the first colorspace, and if so, embedding the tracking data into the encoded chrominance component such that a resulting chrominance component corresponds to a value outside the usable range of the second colorspace prior to any truncation, and wherein the tracking data is embedded in connection with an Escape sequence of the encoded chrominance component.

11. A method for encoding graphics data representing an image while adding tracking data unrelated to representing the image comprising:

encoding a substantially non-zero luminance component for the graphics data according to a first colorspace; and determining whether a usable range for representing color in a second colorspace distinct from the first colorspace for values of a generic chrominance component corresponding to the luminance component is more limited than a preset nominally available range in the first colorspace, and if so preparing an encoded chrominance component that corresponds to the luminance component, includes the tracking data, and corresponds to a value outside the usable range of the second colorspace prior to any truncation.

12. The method of claim 11, wherein determining includes examining a value of the luminance component for determining whether a color is one of at least as dark as a lower luminance threshold and at least as light as an upper luminance threshold.

13. The method of claim 12, wherein the lower luminance threshold corresponds to the color black in the second colorspace and the upper luminance threshold corresponds to the color white in the second colorspace.

14. The method of claim 11, further using a value of a preset quantization factor for preparing the encoded chrominance component.

15. A method for encoding graphics data representing an image while adding tracking data unrelated to representing the image comprising:

encoding a luminance component for the graphics data according to a first colorspace;

determining whether a usable range for representing color in a second colorspace distinct from the first colorspace for values of a generic chrominance component corresponding to the luminance component is more limited than a preset nominally available range in the first colorspace, and if so preparing an encoded chrominance component that corresponds to the luminance component, includes the tracking data, and corresponds to a value outside the usable range of the second colorspace prior to any truncation; and wherein the tracking data is placed in connection with an End-Of-Block pattern of the encoded chrominance component.

16. A method for encoding graphics data representing an image while adding tracking data unrelated to representing the image comprising:

encoding a luminance component for the graphics data according to a first colorspace;

determining whether a usable range for representing color in a second colorspace distinct from the first colorspace for values of a generic chrominance component corresponding to the luminance-component is more limited than a preset nominally available range in the first colorspace, and if so preparing an encoded chrominance component that corresponds to the luminance component, includes the tracking data, and corresponds to a value outside the usable range of the second colorspace prior to any truncation; and wherein the tracking data is placed in connection with an Escape sequence of the encoded chrominance component.

17. A method for decoding data comprising:

decoding a block of a substantially non-zero luminance component of the data that was encoded according to a first colorspace;

selecting a block of a chrominance component of the data that corresponds to the luminance block data;

determining whether a usable range for representing color in a second colorspace distinct from the first colorspace for values of a generic chrominance data block corresponding to the luminance data block is more limited than a preset nominally available range for encoding in the first colorspace, and if so, extracting from the selected chrominance block tracking data corresponding to a value that is outside the usable range of the second colorspace prior to any truncation.

18. The method of claim 17, wherein determining includes examining a value of the luminance component for determining whether a color is one of at least as dark as a lower luminance threshold and at least as light as an upper luminance threshold.

19. The method of claim 18, wherein the lower luminance threshold corresponds to the color black in the second colorspace and the lower luminance threshold corresponds to the color white in the second colorspace.

20. A method for decoding data comprising:

decoding a block of a luminance component of the data that was encoded according to a first colorspace;

selecting a block of a chrominance component of the data that corresponds to the luminance block data;

determining whether a usable range for representing color in a second colorspace distinct from the first colorspace for values of a generic chrominance data block corresponding to the luminance data block is more limited than a preset nominally available range for encoding in the first colorspace, and if so, extracting from the selected chrominance block tracking data corresponding to a value that is outside the usable range of the second colorspace prior to any truncation; and decoding the selected chrominance block after extracting the tracking data.

21. A method for decoding data comprising:

decoding a block of a luminance component of the data that was encoded according to a first colorspace;

selecting a block of a chrominance component of the data that corresponds to the luminance block data;

determining whether a usable range for representing color in a second colorspace distinct from the first colorspace for values of a generic chrominance data block corresponding to the luminance data block is more limited than a preset nominally available range for encoding in the first colorspace, and if so, extracting from the selected chrominance block tracking data corresponding to a value that is outside the usable range of the second colorspace prior to any truncation; and further comprising setting coefficients of the chrominance block data to preset values after extracting the tracking data.

22. A method for decoding data comprising:

decoding a block of a luminance component of the data that was encoded according to a first colorspace;

selecting a block of a chrominance component of the data that corresponds to the luminance block data;

determining whether a usable range for representing color in a second colorspace distinct from the first colorspace for values of a generic chrominance data block corresponding to the luminance data block is more limited than a preset nominally available range for encoding in the first colorspace, and if so, extracting from the selected chrominance block tracking data corresponding to a value that is outside the usable range of the second colorspace prior to any truncation; and setting coefficients of the chrominance block data to a midrange value after extracting the tracking data.

* * * * *

UNITED STATES PATENT AND TRADEMARK OFFICE
CERTIFICATE OF CORRECTION

PATENT NO. : 6,640,005 B1  
DATED : October 28, 2003  
INVENTOR(S) : Westerman et al.

It is certified that error appears in the above-identified patent and that said Letters Patent is hereby corrected as shown below:

Title page,
Item [56], References Cited, U.S. PATENT DOCUMENTS, "5,450,216 A   9/1995  Kasson ......345/603" should read -- 5,450,216 A   9/1995  Kasson .....358/518 --.

Column 3,
Line 50, "0<(R, G, B)<255." should read -- $0 \leq (R, G, B) \leq 255$. --.

Column 6,
Line 8, "the present, invention" should read -- the present invention --.

Column 12,
Line 2, "luminance-component" should read -- luminance component --.
Line 56, "according to a first colorspace; selecting" should read -- according to selecting --.

Signed and Sealed this

Fourth Day of May, 2004

JON W. DUDAS
*Acting Director of the United States Patent and Trademark Office*